(12) United States Patent
Xia et al.

(10) Patent No.: US 9,238,589 B2
(45) Date of Patent: Jan. 19, 2016

(54) WASTE SLUDGE DEWATERING

(75) Inventors: Siqing Xia, Shanghai (CN); Zhiqiang Zhang, Shanghai (CN)

(73) Assignee: Tongji University (CN)

( * ) Notice: Subject to any disclaimer, the term of this patent is extended or adjusted under 35 U.S.C. 154(b) by 961 days.

(21) Appl. No.: 12/950,262

(22) Filed: Nov. 19, 2010

(65) Prior Publication Data

US 2012/0125860 A1 May 24, 2012

(51) Int. Cl.
*C02F 11/14* (2006.01)

(52) U.S. Cl.
CPC ..................... *C02F 11/14* (2013.01)

(58) Field of Classification Search
CPC ....................................... C02F 11/14
USPC ........................................ 210/730
See application file for complete search history.

(56) References Cited

U.S. PATENT DOCUMENTS

| | | | |
|---|---|---|---|
| 3,958,364 A | 5/1976 | Schenck et al. | |
| 4,363,733 A | 12/1982 | Meiller et al. | |
| 4,855,061 A | 8/1989 | Martin | |
| 4,894,161 A | 1/1990 | Shilo et al. | |
| 5,433,865 A | 7/1995 | Laurent | |
| 5,861,100 A | 1/1999 | Nagasaki | |
| 5,906,750 A | 5/1999 | Haase | |
| 6,039,875 A | 3/2000 | Christiansen et al. | |
| 6,368,511 B1 | 4/2002 | Weissenberg et al. | |
| 6,837,998 B2 | 1/2005 | Uphoff | |
| 7,201,847 B1 | 4/2007 | Bowling et al. | |
| 2004/0219651 A1 | 11/2004 | Wang et al. | |
| 2010/0032379 A1* | 2/2010 | Komido et al. | 210/702 |
| 2010/0059453 A1* | 3/2010 | Reardon et al. | 210/727 |

FOREIGN PATENT DOCUMENTS

CN 101070203 A 11/2007

OTHER PUBLICATIONS

Xia et al. (2008) "Production and characterization of a bioflocculant by Proteus mirabilis TJ-1", Bioresource Technology; 99: 6520-6527.
Zhang et al. (2009) "A novel biosorbent for dye removal: Extracellular polymeric substance (EPS) of Proteus mirabilis TH-1", Journal of Hazardous Materials; 163: 279-284.

(Continued)

*Primary Examiner* — Tony G Soohoo
*Assistant Examiner* — Peter Keyworth
(74) *Attorney, Agent, or Firm* — Moritt Hock & Hamroff LLP; Steven S. Rubin, Esq.

(57) ABSTRACT

Technologies are generally described for processes, compositions and systems for waste sludge dewatering. In an example, the process may include receiving a waste sludge including a water component and an initial content of suspended particulates. The process may include treating the waste sludge with a combination of flocculant produced by *Proteus mirabilis* and a flocculant including chloride. The combination may be sufficient to flocculate at least some of the suspended particulates in the water component of the waste sludge and sufficient to produce treated waste sludge. The treated waste sludge may have a water component with a reduced content of suspended particulates. The process may include separating at least some of the water component with a reduced content of suspended particulates from the treated waste sludge to produce dewatered waste sludge.

10 Claims, 7 Drawing Sheets

(56) References Cited

OTHER PUBLICATIONS

Zhang et al. (2010) "Characterization and flocculation mechanism of high efficiency microbial flocculant TJ-F1 from Proteus mirabilis", Colloids and Surfaces B: Biointerfaces; 75: 247-251.
Yu et al. (2009) "Research and Application of Microbial Flocculants in Sewage Treatment and Sludge Dewatering"; Abstract.
Agarwal, S., et al., "Sequential polymer dosing for effective dewatering of ATAD sludges," Water Research, Elsevier Ltd. vol. 39 1301-1310 (2005).
Chang, I.L., et al., "Expression Dewatering of Alum-Coagulated Clay Slurries," Environ. Sci. Technol., American Chemical Society, vol. 31, No. 5, pp. 1313-1319 (1997).
Chen, Y. "Influence of pretreating activated sludge with acid and surfactant prior to conventional conditioning on filtration dewatering," Chemical Engineering Journal, Elsevier B.V., vol. 99, pp. 137-143 (2004).
Chen, Y., et al. "Effect of Acid and Surfactant Treatment on Activated Sludge Dewatering and Settling," Wat. Res. vol. 35, No. 11, pp. 2615-2620 (2001).
Colin, F., and Gazbar, S., "Distribution of Water in Sludges in Relation to Their Mechanical Dewatering," Wat. Res., vol. 29, No. 8, pp. 2000-2005 (1995).
Gong, W-X., et al. "Bioflocculant production by culture of Serratia ficaria and its application in wastewater treatment," Bioresource Technology, vol. 99, pp. 4668-4674 (2008).
Li, X.Y., and Yang, S.F., "Influence of loosely bound extracellular polymeric substances (EPS) on the flocculation, sedimentation and dewaterability of activated sludge," Water Research, Elsevier Ltd, vol. 41, pp. 1022-1030 (2007).
Lian, B., et al., "Microbial flocculation by Bacillus mucilaginosus: Applications and mechanisms," Bioresource Technology, Elsevier Ltd., vol. 99, pp. 4825-4831 (2008).
Lo, I.M.C., et al., "Salinity Effect on Mechanical Dewatering of Sludge with and without Chemical Conditioning," Environ. Sci. Technol., American Chemical Society, vol. 35, No. 23, pp. 4691-4696 (2001).
Ma, F et al., "Applications of Biological Flocculants (BFs) for Coagulation Treatment in Water Purification: Turbidity Elimination," Chem. Biochem. Eng. Q. vol. 22, Issue 3, pp. 321-326 (2008).
Novak, J.T., et al., "Mechanisms of floc destruction during anaerobic and aerobic digestion and the effect on conditioning and dewatering of biosolids," Water Research, Elsevier Science Ltd, vol. 37, pp. 3136-3144 (2003).
Neyens, E., "Advanced sludge treatment affects extracellular polymeric substances to improve activated sludge dewatering," Journal of Hazardous Materials, Elsevier B.V., vol. 106B , pp. 83-92 (2004).
Salehizadeh, H., "Extracellular biopolymeric flocculants Recent trends and biotechnological importance," Biotechnology Advances, Elsevier Science Inc, vol. 19, pp. 371-385 (2001).
Salehizadeh, H., and Shojaosadati, S.A., "Removal of metal ions from aqueous solution by polysaccharide produced from Bacillus firmus," Water Research, Elsevier Ltd., vol. 37, 4231-4235 (2003).
Vaxelaire, J., and Cèzac, P., "Moisture distribution in activated sludges: a review," Water Research, Elsevier Ltd., vol. 38, pp. 2215-2230 (2004).
Yu, C-H., et al., "Stratification Structure of Sludge Flocs with Implications to Dewaterability," Environ. Sci. Technol. American Chemical Society, vol. 42, No. 21, pp. 7944-7949 (2008).
Zhang, Z., et al., "Enhanced dewatering of waste sludge with microbial flocculant TJ-F1 as a novel conditioner," water Research, Elsevier Ltd. vol. 44, pp. 3087-3092 (2010).
Zhiaqiang, Z., "Study on Microbial Flocculants Produced by Multiple Microorganisms," pp. 98.
Zhi-Qiang, Z., et al., "Production and application of a novel bioflocculant by multiple-microorganism consortia using brewery wastewater as carbon source," Journal of Environmental Sciences vol. 19, pp. 667-673 (2007).
Neyens et al. (2004) "Advanced sludge treatment affects extracellular polymeric substances to improve activated sludge dewatering"; Journal of Hazardous Materials, 83-92.
Ma et al. (2008) Applications of Biological Flocculants (BFs) for Coagulation Treatment in Water Purification: Turbidity Elimination; Chem. Biochem. Eng. Q., 22(3): 321-326.
Gong, et al. (2008) "Bioflocculant production by culture of Serratia ficaria and its application in wastewater treatment"; Bioresource Technology, 99 4668-4674.
Colin et al. (1995) "Distribution of Water in Sludges in Relation to their Mechanical Dewatering"; Wat. Res., vol. 29 (8): 2000-2005.
Chen et al. (2001) "Effect of Acid and Surfactant Treatment on Activated Sludge Dewatering and Settling"; Wat. Res., 35(11): 2615-2620.
Chang et al. (1997) "Expression Dewatering of Alum-Coagulated Clay Slurries"; Environ. Sci. Technol., 31 1313-1319.
Salehizadeh et al. (2001) "Extracellular biopolymeric flocculants Recent trends and biotechnological importance"; Biotechnology Advances, 19 371-385.
Li et al. (2007) "Influence of loosely bound extracellular polymeric substances (EPS) on the flocculation, sedimentation and dewaterability of activated sludge"; Water Research, 41 1022-1030.
Chen et al. (2004) "Influence of pretreating activated sludge with acid and surfactant prior to conventional conditioning on filtration dewatering"; Chemical Engineering Journal, 99 137-143.
Novak et al. (2003) "Mechanisms of floc destruction during anaerobic and aerobic digestion and the effect on conditioning and dewatering of biosolids"; Water Research, 37 3136-3144.
Lian et al. (2008) "Microbial flocculation by Bacillus mucilaginosus: Applications and mechanisms"; Bioresource Technology, 99 4825-4831.
Vaxelaire et al. (2004) "Moisture distribution in activated sludges: a review"; Water Research, 38 2215-2230.
Zhang et al. (2007) "Production and application of a novel bioflocculant by multiple-microorganism consortia using brewery wastewater as carbon sauce"; Journal of Environmental Sciences, 19 667-673.
Xia et al. (2008) "Production and characterization of a bioflocculant by Proteus mirabilis TJ-1"; Bioresource Technology, 99 6520-6527.
Salehizadeh et al. (2003) "Removal of metal ions from aqueous solution by polysaccharide produced from Bacillus firmus"; Water Research, 37 4231-4235.
Lo et al. (2001) "Salinity Effect on Mechanical Dewatering of Sludge with and without Chemical Conditioning"; Environ. Sci. Technol., 35 4691-4696.
Agarwal et al, (2005) "Sequential polymer dosing for effective dewatering of ATAD sludges"; Water Research, 39 1301-1310.
Yu et al. (2008) "Stratification Structure of Sludge Flocs with Implications to Dewaterability"; Environ. Sci. Technol., 42 7944-7949.
Ghosh et al. (2009) "Application of a novel biopolymer for removal of Salmonella from poultry wastewater"; Environmental Technology, 30(4): 337-344.
Ghosh et al. (2009) "Effective Removal of Cryptosporidium by a Novel Bioflocculant", Water Environmental Research, 81(2): 160-164.
Zhiqiang (2005) "Study on Microbial Flocculants Produced by Multiple Microorganisms"; Nanchang University, Nanchang, 1-84 (including English Abstract).

\* cited by examiner

Fig. 2    200

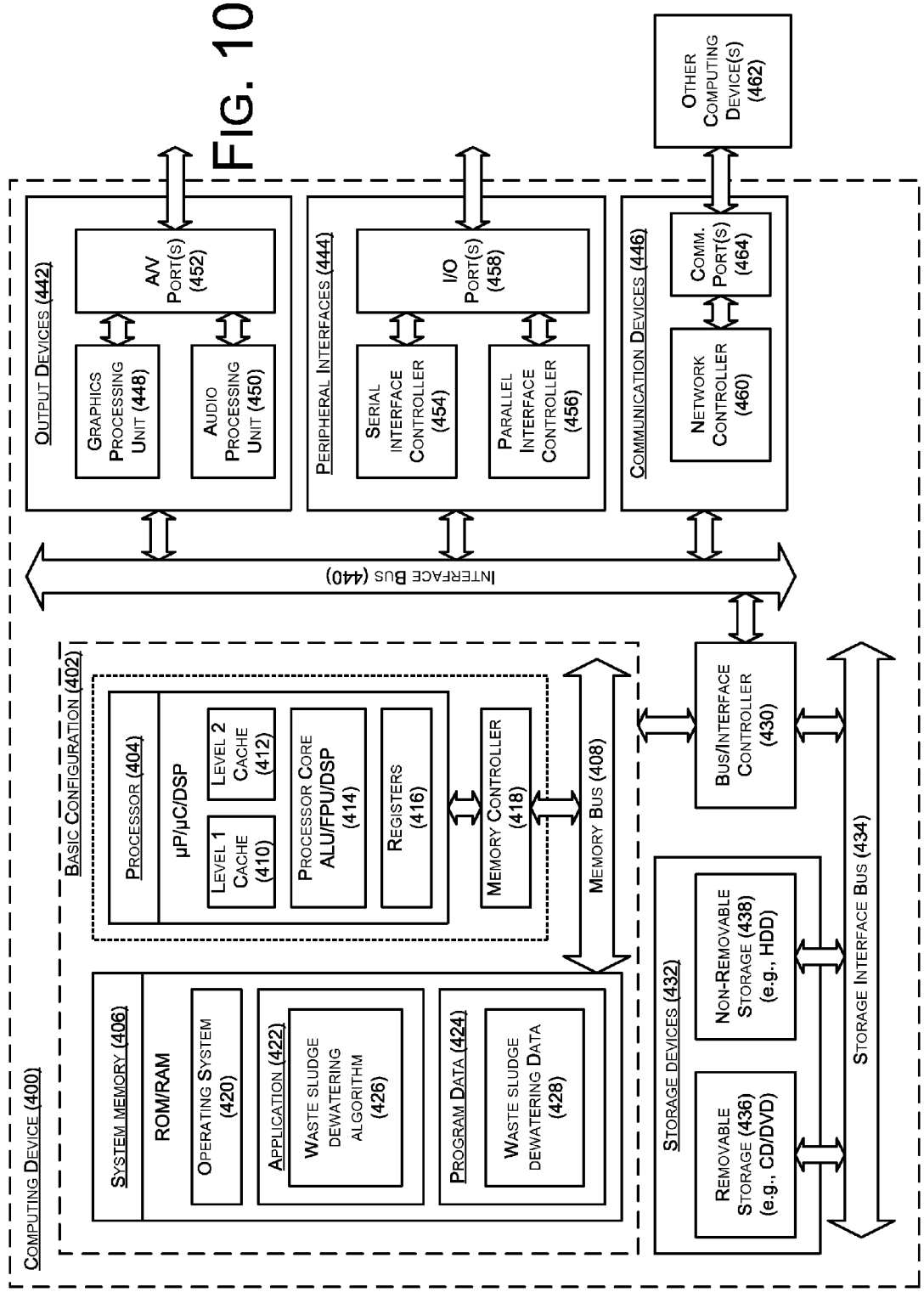

WASTE SLUDGE DEWATERING

BACKGROUND

Unless otherwise indicated herein, the materials described in this section are not prior art to the claims in this application and are not admitted to be prior art by inclusion in this section.

In waste sludge dewatering, waste sludge may be treated to obtain a dry product. The dry product may provide a substantial reduction in storage volume, facilitate transportation, and reduce energy in instances where incineration of the product is performed. Chemical conditioning may be utilized to facilitate dewatering of waste sludge. The conditioning may cause the flocculation of suspended particulates in the waste sludge.

SUMMARY

Technologies are generally described for processes, compositions and systems for dewatering waste sludge.

In an example, a process for dewatering waste sludge is generally described. In the example, the process may include receiving a waste sludge including a water component and an initial content of suspended particulates. The process may include treating the waste sludge with a combination of flocculant produced by *Proteus mirabilis* and a flocculant including chloride. The amount may be sufficient to flocculate at least some of the suspended particulates in the water component of the waste sludge and sufficient to produce treated waste sludge. The treated waste sludge may have a water component with a reduced content of suspended particulates. The process may include separating at least some of the water component with a reduced content of suspended particulates from the treated waste sludge to produce dewatered waste sludge.

In an example, a composition effective to flocculate suspended particulates in waste sludge is generally described. In the example, the composition includes a flocculant produced from *Proteus mirabilis* and at least one synthetic polymeric flocculant.

In an example, a system effective to dewater waste sludge is generally described. The waste sludge may include a water component having an initial content of suspended particulates. The system may include a first source of flocculant obtained from *Proteus mirabilis*. The system may further include a second source of flocculant including chloride. The system may further include a chamber in communication with the first source and the second source. The chamber may be effective to receive the microbial flocculant, the flocculant including chloride and the waste sludge and produce treated waste sludge. The treated waste sludge may have a water component with a reduced content of suspended particulates. The system may include a separator in communication with the chamber. The separator may be effective to separate at least some of the water component with a reduced content of suspended particulates from the treated waste sludge to produce dewatered waste sludge.

The foregoing summary is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 depicts a block diagram illustrating an example computing device that is arranged to implement waste sludge dewatering;

Figure 1:
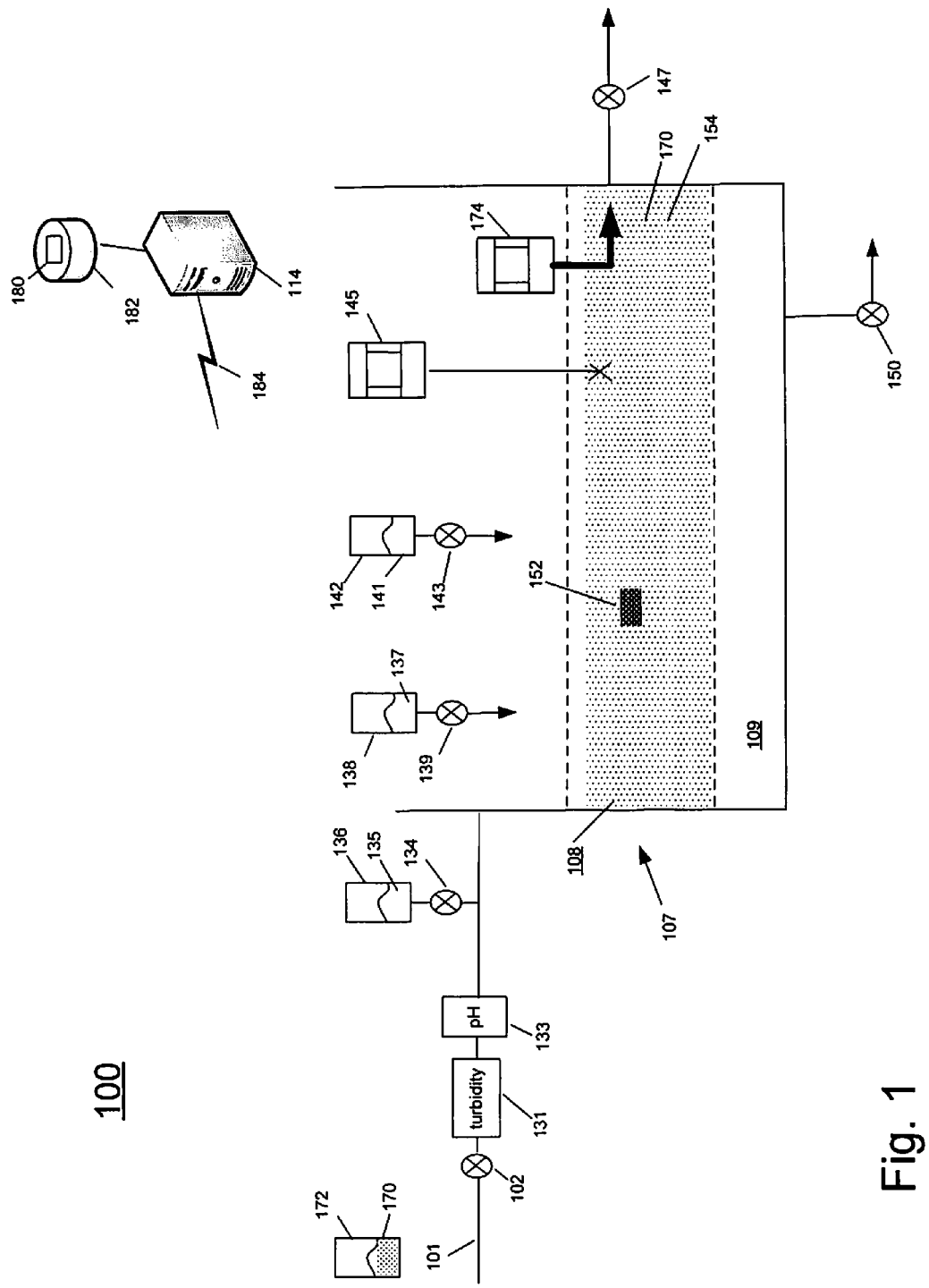
FIG. 1 illustrates an example system that can be utilized to implement waste sludge dewatering.

all arranged according to at least some embodiments described herein.

DETAILED DESCRIPTION

In the following detailed description, reference is made to the accompanying drawings, which form a part hereof. In the drawings, similar symbols typically identify similar components unless context dictates otherwise. The illustrative embodiments described in the detailed description, drawings and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated and designed in a wide variety of different configurations, all of which are explicitly contemplated herein.

This disclosure is generally drawn, inter alia, to processes, compositions and systems for waste sludge dewatering.

Briefly stated, technologies are generally described for processes, compositions and systems for waste sludge dewatering. In an example, the process may include receiving a waste sludge including a water component and an initial content of suspended particulates. The process may include treating the waste sludge with a combination of a flocculant produced by *Proteus mirabilis* and a second flocculant. The term "flocculant" as used herein generally includes any agent or agents that cause or enhance flocculation. Moreover, the term "flocculant" and the terms "conditioner" or "flocculation aid" may be used interchangeably herein. In certain embodiments, the second flocculant may include one or more of inorganic flocculants or organic flocculants. Illustrative embodiments of inorganic flocculants may include, but are not limited to, multivalent metal ions, such as but not limited to, aluminum, iron, calcium or magnesium ions. Illustrative embodiments of organic flocculants may include, but are not limited to, polymeric flocculants, such as but not limited to polyacrylamide (PAM) or derivatives thereof, or polysaccharides such as starch or derivatives thereof. In one illustrative embodiment, the second flocculant includes calcium chloride. In another illustrative embodiment, the second flocculant includes aluminum chloride or polyaluminum chloride (PAC). In still another illustrative embodiment, the second flocculant includes a cationic derivative of PAM, such as poly(acrylamide (2-(methacryloyloxy)ethyl)-trimethylammonium chloride) (P(AM-DMC)). The combination may be sufficient to flocculate at least some of the suspended particulates in the water component of the waste sludge and sufficient to produce treated waste sludge. The treated waste sludge may have a water component with a reduced content of suspended particulates. The process may include separating at least some of the water component with a reduced content of suspended particulates from the treated waste sludge to produce dewatered waste sludge.

Any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement waste sludge dewatering in accordance with at least some embodiments described herein. As discussed in more detail below, the system may be configured to treat a waste sludge with a flocculant produced by *Proteus mirabilis* and a flocculant including chloride, such as PAM or calcium chloride, to produce treated waste sludge. In some examples, the treated waste sludge has a water component with reduced suspended particulates. That water component may be separated from the rest of the waste sludge.

A waste sludge dewatering system 100 may include a processor 114 which may be adapted in communication with a memory 182 that includes instructions 180 stored therein. Processor 114 may be configured, such as by instructions 180, to control at least some of the operations described below. Processor 114 may be in communication with at least some of the elements mentioned below through a communication link 184.

System 100 may further include a waste sludge inlet 101 effective to receive waste sludge 170 from a source 172, and associated flow control valve 102. Waste sludge may include, for example, surplus biosolids produced during wastewater treatment by biological processes. Waste sludge 170 may include waste water and organic pollutants. Waste sludge 170 may include a water component and an initial content of suspended particulates. System 100 may include a turbidometer 131 effective to measure a turbidity of the inflow of waste sludge 170. A pH meter 133 may be used to measure a pH of waste sludge 170. System 100 may include a source 136 of pH adjustment agent 135 and an associated metering valve 134. System 100 may include a chamber 107 effective to receive waste sludge 170. Chamber 107 may include a flocculation zone 108 where flocculation of suspended particulates in the waste sludge may take place, and a settling zone 109 where settling of flocculated particulates may take place. System 100 may include a source 138 of exocellular microbial flocculant 137 produced by *Proteus mirabilis* (the flocculant sometimes referred to herein as "TJ-F1"), and an associated metering valve 139. System 100 may include a source 142 of a synthetic polymeric flocculant 141, such as poly(acrylamide (2-(methacryloyloxy)ethyl)-trimethylammonium chloride) (sometimes referred to as "P(AM-DMC)") and/or cationic derivatives, and associated metering valve 143. Chamber 107 may be in communication with source 138 and source 142. System 100 may include a mixer 145 which may be adapted to disperse flocculants as is discussed below. A separator machine 174 may be adapted to separate water from treated waste sludge 170 as is discussed below.

In operation, waste sludge 170 may be introduced continuously or intermittently into chamber 107 through waste sludge inlet 101. Processor 114 may be configured to regulate a flow of waste sludge 170 into chamber 107 through control of metering valve 102. Metering valve 102 may be adapted to generate a signal indicating a volume or level of waste sludge entering chamber 107. Turbidometer 131 may be configured to determine a turbidity of waste sludge 170 inflow passing through inlet 101 and into chamber 107 and generate and send a turbidity signal to processor 114. The pH meter 133 may be configured to measure a pH of waste sludge 170 and generate and send a pH measurement signal to processor 114.

The pH of waste sludge 170 can be adjusted as desired by introduction of pH adjustment agent 135. The pH adjustment agent 135 may include an alkaline material such as sodium hydroxide or an acidic material such as HCl, and may produce a pH level of waste sludge 170 which is conducive to flocculation, such as a pH of from about 7.1 to about 7.8. Processor 114 may be configured to control an amount of pH adjustment agent introduced into waste sludge 170 through metering valve 134 in response to the pH measurement signal.

In some examples, waste sludge 170 may be introduced into chamber 107 and may be treated with a combination of flocculant including TJ-F1 and a flocculant including chloride. The flocculant including chloride may be effective to reduce a repulsive force between suspended particulates and TJ-F1. Specific amounts of flocculant for a particular waste sludge may vary based on a number of factors. For example, some factors may include an initial suspended particulates content in waste sludge 170, the use of one or more flocculation aids such as calcium chloride ($CaCl_2$), a temperature of waste sludge 170, etc. In an example, an amount of TJ-F1 when used as the sole flocculant may vary from about 0.05 to 0.25% weight to weight of waste sludge. In an example, weight ratios may range from about 0.03325 to 0.532 for TJ-F1 to $CaCl_2$. In an example, weight ratios for TJ-F1 to P(AM-DMC) may range from about 0.1:1 to about 4:1. In an example, a 0.17% (w/w) TJ-F1 and 1.3% (w/w) $CaCl_2$ may be used with a system pH of 7.5.

Processor 114 may be configured to control an introduction of TJ-F1 137 to chamber 107 from source 138 through metering valve 139. For example, processor 114 may control the introduction of TJ-F1 based on the turbidity determined by turbidometer 131. Processor 114 may be configured to control an introduction of P(AM-DMC) from source 142 to chamber 107 through metering valve 143. Processor 114 may be configured to introduce a controlled amount of flocculants in a combined flocculant composition in unison or independently of each other.

In some examples, one or more flocculation aids, such as calcium chloride, may be present in source 138 of TJ-F1 and/or source 142 of P(AM-DMC) 141. In an example, processor 114 may be configured to control an introduction of flocculation aid(s) into chamber 107 through metering valves 139, 143. An amount of added flocculation aid(s) may vary. In an example, amounts of flocculation aid may range from about 0.05 to about 2.0% based on the total weight of TJ-F1 and other flocculant(s).

In an example, TJ-F1 137 may be introduced into chamber 107 as a powder or a liquid, such as in an aqueous solution or in suspension. In an example, synthetic polymeric flocculant(s) 141 and/or flocculation aids 137, 141 may be introduced into chamber 107 as a powder or as a liquid. Mixer 145 may be configured to facilitate distribution of flocculant(s) and flocculation aid(s) in waste sludge 170 in chamber 107.

Formation of treated waste sludge including flocculated suspended particulates 152 may begin upon contact of the non-flocculated particulates 154 in waste sludge 170 with the flocculant(s) and/or flocculation aid. As flocculated suspended particulates 152 form in flocculation zone 108 of chamber 107, flocculated suspended particulates 152 begin to descend under the influence of gravity into settling zone 109. In an example, flocculated suspended particulates 152 may be left to settle for a period of time of, for example, from about three minutes to about seven minutes. After settling, a water component of waste sludge 170 may have a reduced content of suspended particulates 154 and may be separated from the treated waste sludge through valve 147 by separator machine 174. Dewatered waste sludge including, for example, flocculated suspended particulates 152 which have settled in settling zone 109, may be separated through valve 150.

Figure 2:
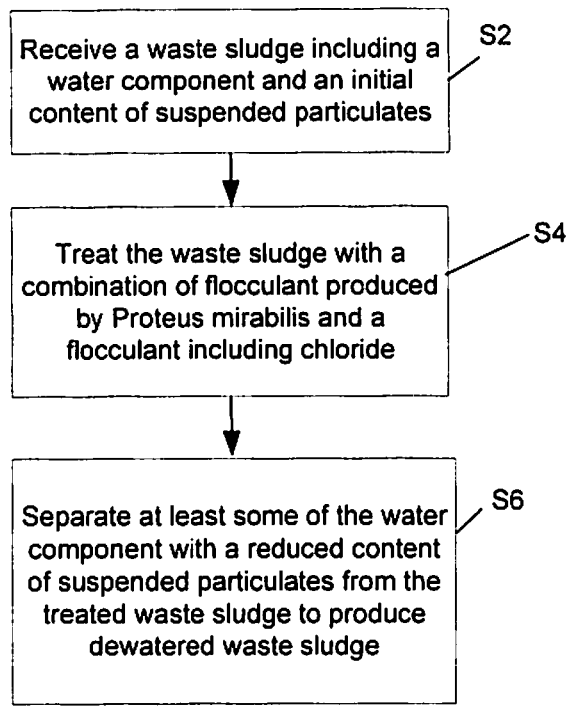
FIG. 2 depicts a flow diagram for an example process for waste sludge dewatering.

FIG. 2 depicts a flow diagram for an example process for dewatering waste sludge in accordance with at least some embodiments described herein. An example process may include one or more operations, actions or functions as illustrated by one or more of the blocks S2, S4 and/or S6. Although illustrated as discrete blocks, various blocks may be divided into additional blocks, combined into fewer blocks or eliminated depending on the desired implementation. Process 200 may begin at block S2.

At block S2, a system may receive a waste sludge including a water component and an initial content of suspended particulates. Processing may continue from block S2 to block S4.

At block S4, the waste sludge may be treated with an amount of flocculant produced by *Proteus mirabilis* and a flocculant including chloride. Processing may continue from block S4 to block S6.

At block S6 the system may separate at least some of the water component with a reduced content of suspended particulates from the treated waste sludge to produce dewatered waste sludge.

In an example, waste sludge from a waste water treatment plant may be used. The waste water may be treated using an anaerobic-anoxic-oxic process. In the example, the microbial flocculant TJ-F1 may be obtained from *Proteus mirabilis* (GenBank accession No. EF091150) and may be fermented in the following manner. A 150-mL flask including 50 mL production medium may be inoculated with 1.0 mL pre-culture of *Proteus mirabilis* strain TJ-1 at an inoculum size of about 2%, incubated at 25° C. at a pH of about 7.0 in a rotary shaker at 130 rpm for 48 hours to produce a fermentation broth. In the example, the production medium included (per liter): 10 g glucose, 1 g peptone, 0.3 g $MgSO_4.7H_2O$, 5 g $K_2HPO_4$, and 2 g $KH_2PO_4$. The fermentation broth may include a nutrient carbon source including glucose and a nutrient nitrogen source including peptone. The fermentation broth may be centrifuged (4000×g, 30 min) to separate the cells and cellular debris. Two volumes of cold ethanol may be added to the broth. The obtained precipitate may be re-dissolved in distilled water followed by the addition of about 2% cetylpyridinium chloride solution (CPC) with stirring. After about 2 hours, the precipitate collected by centrifugal separation of the bioflocculant and the CPC complex may be dissolved in NaCl (0.5 M). In the example, two volumes of cold ethanol may then be added to obtain the precipitate, washed two times with ethanol and then vacuum-dried.

The resulting broth supernatant may include exocellular microbial flocculant TJ-F1 which may be preserved at 4 degrees Celsius for future use. In the example, about 1.33 g of the microbial flocculant, whose molecular weight may be about $1.2 \times 10^5$ Da, could be recovered from 1.0 L of fermentation broth.

In the example, P(AM-DMC) and $CaCl_2$ may be provided from SINOPHARM CHEMICAL REAGENT Co., Ltd., China, and may be dissolved in distilled water. Dewatering of waste sludge samples may be measured by the Buchner funnel test, and expressed in terms of specific resistance in filtration (SRF) and time to filter (TFF). In example tests, waste sludge treatment material, or "conditioner", may be introduced into a 200-mL beaker with 50 mL of waste sludge and the pH may be adjusted to a set value by the addition of NaOH (0.1 M) or HCl (0.1 M) as desired. After stirring for one minute, the mixture may be left to stand for 5 min. The stirred mixture may then be poured into a Buchner funnel fitted with filter paper. In the example, after two minutes of gravitational drainage, a vacuum of 50 kPA may be applied. The volume of the filtrate collected at different times may be recorded. TFF may be the time when the volume of the filtrate reaches half of the volume of the sludge, and SRF may be calculated by using the following equation $$SRF = \frac{2bPA^2}{\mu c}$$

where P is the pressure of filtration measured in $N/m^2$; A is the filtration area, measured in $m^2$; $\mu$ is the filtrate viscosity, measured in $N\ s/m^2$; c is the weight of solids per unit volume of filtrate, measured in $kg/m^3$ and equals $1/C_i/(100-C_i)-C_f/(100-C_f)$; $C_i$ is the initial moisture content, measured in percentages %; $C_f$ is the final moisture content, measured in percentages %; b is the slope determined from the $t/V_f(y)-V_f(x)$ plot; $V_f$ is the volume of filtrate, measured in $m^3$; and, t is the filtration time, measured in s.

Figure 3:
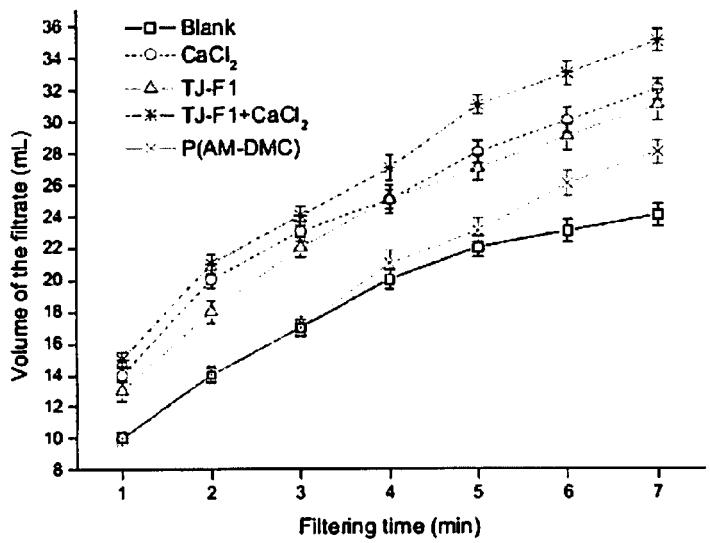
FIG. 3 depicts a graph of filtering time versus volume of filtrate as may be produced in an example system.
Figure 4:
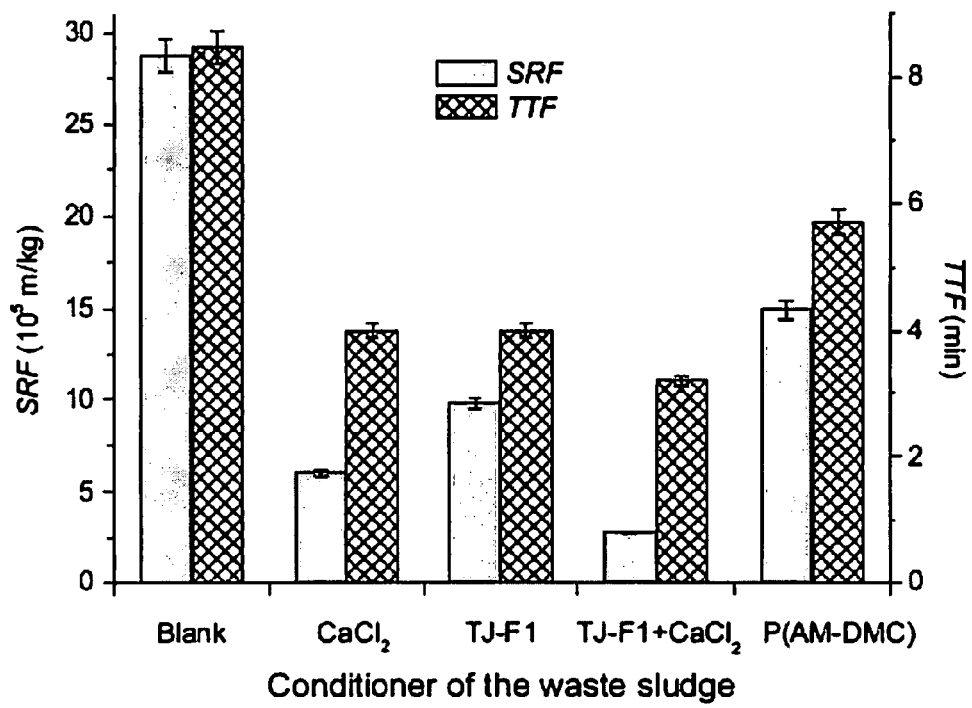
FIG. 4 depicts a table of conditioner of waste sludge versus SRF (specific resistance in filtration) as may be produced in an example system.

FIG. 3 depicts a graph of filtering time versus volume of filtrate as may be produced in an example system arranged according to at least some embodiments described herein. FIG. 4 depicts a table of conditioner of waste sludge versus SRF (specific resistance in filtration) as may be produced in an example system arranged according to at least some embodiments described herein. In the example, as shown in FIGS. 3 and 4, various conditioners, including 5 mL distilled water, 5 mL $CaCl_2$ (1%, w/v); 5 mL TJ-F1, 2 mL TJ-F1+3 mL $CaCl_2$ (1%, w/v) and 5 mL P(AM-DMC), were separately added to the waste sludge test samples. The system pH was adjusted to 7.5 for the Buchner funnel test. The volumes of the filtrates recorded at different times and the values of both SRF and TFF obtained for the various conditioners are shown in FIGS. 3 and 4.

Figure 5:
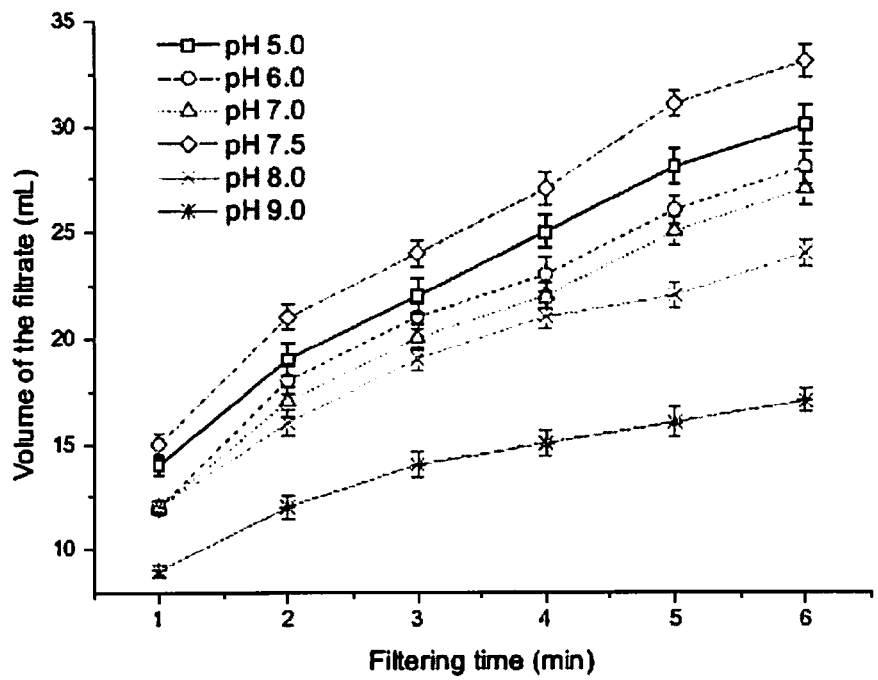
FIG. 5 depicts a graph of filtering time versus volume of filtrate as may be produced in an example system.

FIG. 5 depicts a graph of filtering time versus volume of filtrate as may be produced in an example system arranged according to at least some embodiments described herein. In an example, the effect of system pH on the dewaterability of a waste sludge sample was evaluated by introducing 50 mL of the sludge to a 200-mL beaker followed by 2 mL of TJ-F1 and 3 mL of $CaCl_2$. The system pH was then adjusted to 5.0, 6.0, 7.0, 7.5, 8.0 or 9.0 for the Buchner funnel test. The volumes of the filtrates recorded every one minute are shown in FIG. 5.

Figure 6:
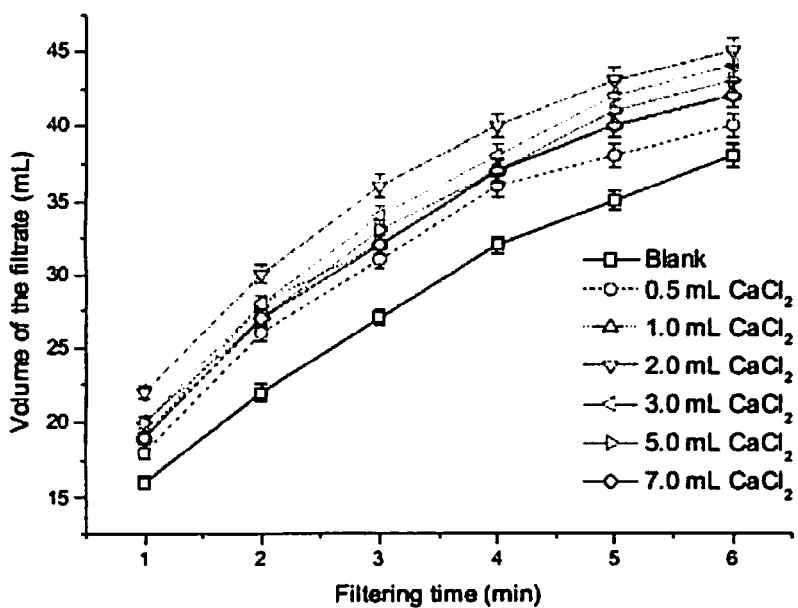
FIG. 6 depicts a graph of filtering time versus volume of filtrate as may be produced in an example system.

FIG. 6 depicts a graph of filtering time versus volume of filtrate as may be produced in an example system arranged according to at least some embodiments described herein. In an example, 2 mL of TJ-F1 and various volumes of $CaCl_2$ (1%, w/v), including 0 mL, 0.5 mL, 1.0 mL, 2.0 mL, 3.0 mL, 5.0 mL, and 7.0 mL, were separately introduced to 200-mL beakers containing 50 mL of waste sludge. The system pH was then adjusted to 7.5 for the Buchner funnel test. The volumes of the filtrates recorded every one minute are shown in FIG. 6.

Figure 7:
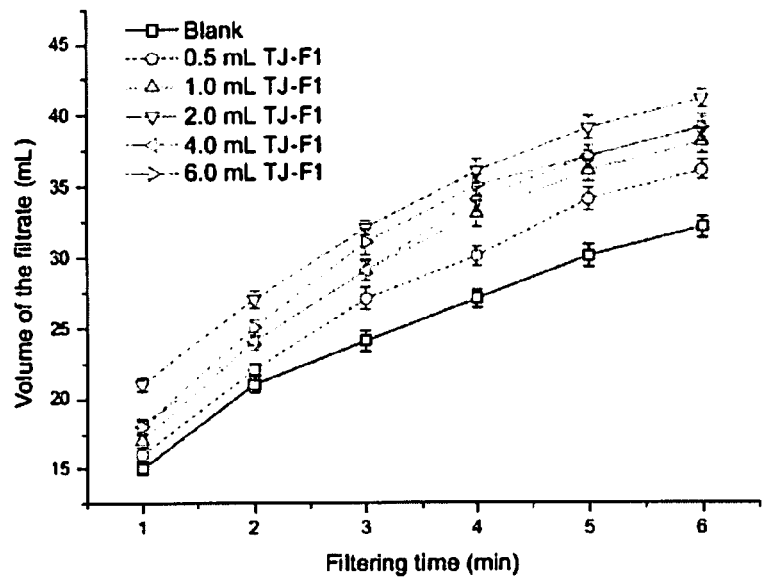
FIG. 7 depicts a graph of filtering time versus volume of filtrate as may be produced in an example system.

FIG. 7 depicts a graph of filtering time versus volume of filtrate as may be produced in an example system arranged according to at least some embodiments described herein. In an example, $CaCl_2$ (1%, w/v) and various volumes of TJ-F1 including 0 mL, 0.5 mL, 1.0 mL, 2.0 mL, 4.0 mL, and 6.0 mL, were separately introduced to 200-mL beakers containing 50 mL of waste sludge. The system pH was then adjusted to 7.5 for the Buchner funnel test. The volumes of the filtrates recorded every one minute are shown in FIG. 7.

Figure 8:
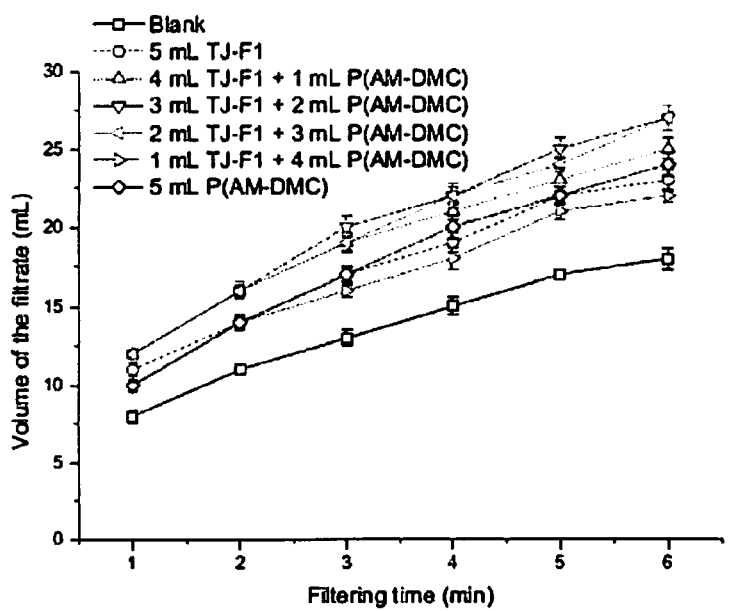
FIG. 8 depicts a graph of filtering time versus volume of filtrate as may be produced in an example system.

FIG. 8 depicts a graph of filtering time versus volume of filtrate as may be produced in an example system arranged according to at least some embodiments described herein. In an example, the dewatering effectiveness of a composition containing both TJ-F1 and P(AM-DMC) was evaluated at volumetric ratios of 5:0, 4:1, 3:2, 2:3, 1:4, and 0:5. In the examples, 5 mL of combined flocculant was introduced to 200-mL beakers with 50 mL of the waste sludge. The pH was then adjusted to 7.5 for the Buchner funnel test. The volumes of the filtrates recorded every one minute are shown in FIG. 8.

Figure 9:
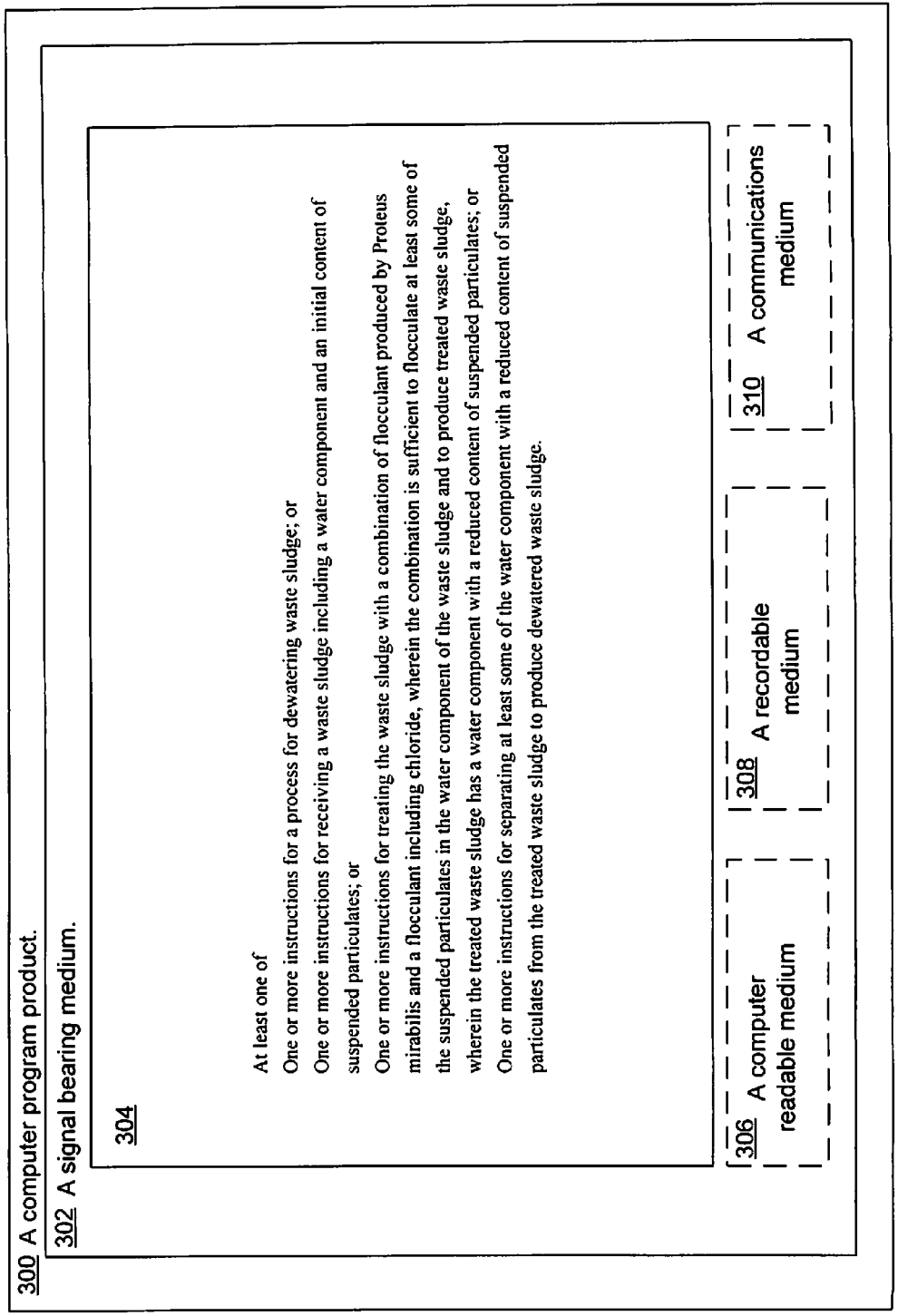
FIG. 9 illustrates a computer program product that can be utilized to implement waste sludge dewatering.

FIG. 9 illustrates a computer program product that can be utilized to implement dewatering of waste sludge in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-8. Thus, for example, referring to system 100, processor 114 may undertake one or more of the blocks shown in FIG. 9 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 10 is a block diagram illustrating an example computing device that is arranged to implement waste sludge dewatering arranged according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a waste sludge dewatering algorithm 426 that is arranged to perform the functions as described herein including those described with respect to system 100 of FIG. 1. Program data 424 may include waste sludge dewatering data 428 that may be useful for implementing waste sludge dewatering as described herein. In some embodiments, application 422 may be arranged to operate with program data 424 on operating system 420 such that implementing waste sludge dewatering may be provided. This described basic configuration 402 is illustrated in FIG. 10 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process for dewatering waste sludge, the process comprising:
   receiving a waste sludge including a water component and an initial content of suspended particulates;
   treating the waste sludge with a combination of flocculant produced by *Proteus mirabilis* and a powdered flocculant including chloride, wherein the powdered flocculant including chloride is poly(acrylamide (2-(methacryloyloxy)ethyl)-trimethylammonium chloride) and is a cationic flocculant, wherein the combination is sufficient to flocculate at least some of the suspended particulates in the water component of the waste sludge and to produce treated waste sludge, wherein the treated waste sludge has a water component with a reduced content of suspended particulates; and
   separating at least some of the water component with a reduced content of suspended particulates from the treated waste sludge to produce dewatered waste sludge.

2. The process of claim 1, further comprising adjusting the pH of the waste sludge from about 7.1 to about 7.8 prior to, with, or following treating the waste sludge.

3. The process of claim 1, further comprising adding the powdered flocculant including chloride to the waste sludge prior to, with, or following adding the flocculant produced by *Proteus mirabilis*, wherein the powdered flocculant including chloride is effective to reduce a repulsive force between the suspended particulates and the flocculant produced by *Proteus mirabilis*.

4. The process of claim 1, further comprising adding about 0.05% to about 2.0% weight of calcium chloride to weight of powdered flocculant including chloride to the waste sludge and adding about 0.05% to 0.25% weight of calcium chloride to weight of flocculant produced by *Proteus mirabilis* to the waste sludge.

5. The process of claim 1, further comprising separating the water by allowing the treated waste sludge to settle for about three minutes to about seven minutes.

6. The process of claim 1, wherein the powdered flocculant including chloride is a synthetic polymeric flocculant.

7. The process of claim 1, wherein the flocculant produced by *Proteus mirabilis* is obtained by:
   fermenting a fermentation broth comprising at least one nutrient carbon source and at least one nutrient nitrogen source including *Proteus mirabilis* at about 25 degrees Celsius for about 48 hours at an initial pH of about 7.0 to produce flocculant in the fermentation broth; and
   separating flocculant containing fermentation broth from *Proteus mirabilis* cells and/or cellular matter.

8. The process of claim 7, wherein the fermentation broth includes glucose as a nutrient carbon source and peptone as a nutrient nitrogen source.

9. The process of claim 7, further comprising:
   separating the flocculant produced by *Proteus mirabilis* from the fermentation broth; and
   drying the flocculant produced by *Proteus mirabilis*.

10. The process of claim 1, wherein a weight ratio of the flocculant produced by *Proteus mirabilis* to the poly(acrylamide (2-(methacryloyloxy)ethyl)-trimethylammonium chloride) is from about 0.1:1 to about 4:1.

* * * * *

UNITED STATES PATENT AND TRADEMARK OFFICE
CERTIFICATE OF CORRECTION

PATENT NO. : 9,238,589 B2
APPLICATION NO. : 12/950262
DATED : January 19, 2016
INVENTOR(S) : Xia et al.

It is certified that error appears in the above-identified patent and that said Letters Patent is hereby corrected as shown below:

On the Title Page, in Item (73), under "Assignee", in Column 1, Line 1, delete "Tongji University (CN)" and insert -- Tongji University, Shanghai (CN) --, therefor.

Signed and Sealed this
Twenty-sixth Day of July, 2016

Michelle K. Lee
*Director of the United States Patent and Trademark Office*